(12) United States Patent
Glance et al.

(10) Patent No.: US 6,631,451 B2
(45) Date of Patent: Oct. 7, 2003

(54) SYSTEM AND METHOD FOR CACHING

(75) Inventors: Natalie S. Glance, Meylan (FR); Bernardo A. Huberman, Palo Alto, CA (US); Lada A. Adamic, Redwood City, CA (US); James Pitkow, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/128,011

(22) Filed: Apr. 22, 2002

(65) Prior Publication Data
US 2002/0147895 A1 Oct. 10, 2002

Related U.S. Application Data

(63) Continuation of application No. 09/470,126, filed on Dec. 22, 1999, now Pat. No. 6,415,368.

(51) Int. Cl.[7] .............................................. G06F 12/00
(52) U.S. Cl. ........................ 711/158; 711/151; 711/133
(58) Field of Search ................. 711/133, 134, 711/130, 147, 159, 158, 151

(56) References Cited

U.S. PATENT DOCUMENTS

| | | | |
|---|---|---|---|
| 4,996,642 A | 2/1991 | Hey | 705/27 |
| 5,043,885 A * | 8/1991 | Robinson | 711/133 |
| 5,790,935 A | 8/1998 | Payton | 725/91 |
| 5,842,199 A | 11/1998 | Miller et al. | 707/2 |
| 5,864,854 A | 1/1999 | Boyle | 707/10 |
| 5,924,116 A | 7/1999 | Aggarwal et al. | 711/122 |
| 5,956,039 A | 9/1999 | Woods et al. | 345/419 |
| 6,016,475 A | 1/2000 | Miller et al. | 705/1 |
| 6,085,193 A | 7/2000 | Malkin et al. | 707/10 |
| 6,098,064 A | 8/2000 | Pirolli et al. | 707/2 |
| 6,098,096 A | 8/2000 | Tsirigotis et al. | 709/213 |
| 6,266,649 B1 | 7/2001 | Linden et al. | 705/26 |
| 6,415,368 B1 * | 7/2002 | Glance et al. | 711/158 |

OTHER PUBLICATIONS

Huberman et al., "Novelty and Social Search in the World Wide Web", © 1998, p. 1–17.*
Abdulla, "Analysis and Modeling of World Wide Web Traffic", © 1998, Ghaleb Abdulla, p. i–114.*
Gail Kaiser, Christopher Vaill, Stephen Dossick, "A Workgroup Model For Smart Pushing and Pulling", IEEE Comput. Soc. US, Jun. 1999, pp. 15–21.
Michal Kurcewicz, Wojtek Sylwestrzak, Adam Wierzbicki, "A filtering algorithm for Web caches", Computer Networks and ISDN Systems, 1998, pp. 2203–2200.
Evangelos P. Markatos, Catherine E. Chronaki, "A Top–10 Approach to Prefetching on the Web", Technical Report 173, ICS–FORTH, 1996, pp. 1–15.
Mike Reddy, Graham P. Fletcher, "An Adaptive Mechanism for Web Browser Cache Management", IEEE Internet Computing, 1998, pp. 78–81.

* cited by examiner

Primary Examiner—Donald Sparks
Assistant Examiner—Brian R. Peugh
(74) Attorney, Agent, or Firm—Jeannette Walder

(57) ABSTRACT

A system and method of caching uses quality or value attributes, provided for example, by a recommender system or by a dynamical analysis of site accesses, which are attached to cached information to prioritize items in the cache. Documents are prioritized in the cache according to the relative value of their content. Value data may be provided from a recommender system which provides a value for a document according to user recommendations (using explicit recommendations) or from statistical analysis of site visits from unique users (implicit recommendations) or a combination of the two to identify the higher value documents.

16 Claims, 3 Drawing Sheets

SYSTEM AND METHOD FOR CACHING

CROSS REFERENCE TO RELATED APPLICATION

This is a continuation of U.S. application Ser. No. 09/470,126, filed Dec. 22, 1999, now U.S. Pat. No. 6,415,368, the contents of which are incorporated herein by reference.

FIELD OF THE INVENTION

This invention relates generally to a system and method for optimizing end user and network resources in network systems where various levels of caching exist.

BACKGROUND OF THE INVENTION

Network systems, such as intranets and the World Wide Web (the Web), employ caching (the use of resources like memory, disk, etc. with very short access time for frequently used data files) at various levels in order to decrease network loads and response times. Generally, any sort of data file or document may be cached, including text, graphics, video, images, audio files, html files, Web pages, etc. Web caching typically stores the content associated with URLs for Web pages.

In client-server information systems, local client resources, most typically memory (RAM), is largely used to cache data and to minimize future interaction with servers. When using caching, the client computer initially examines whether the requested document is in the local cache. If the document exists in the local cache and it is current (where current means that a newer version of the document does not exist), then the document is immediately delivered to the user. Otherwise, if the document is not in the cache, the client computer fetches the document from a server located somewhere on the system or the Web. Depending on the document size and the available transmission rate, delivery of the document to the user could take a significant amount of time.

Determining which documents to cache and when to replace them is achieved through a caching replacement algorithm. Most state of the art web server, proxy, and client caching replacement algorithms typically take into account variables such as frequency of access, recency of access, data file (document) size, and estimated document retrieval latency to determine the priority of a document in the cache. The primary assumption behind these parameters is that prior usage will be a reliable predictor of future access. These parameters also enable cache replacement policies to optimize hit rates, byte-weighted hit rates, and end-user latency. More recent algorithms employ these variables in adaptive frameworks since global weightings have been found non-optimal for individual caches and traffic patterns change over time.

Various other caching techniques, such as the use of callback and prefetching, have been suggested. These techniques, however, do not always improve performance. Callback, for example, is not suitable for Web objects that may be cached in many proxies. Prefetching is also unsuitable where cache hit rates are low. It is often difficult to predict when preemptive document checking will improve performance. Some programs are available which allow a user to identify and download URLs from the Web onto their client computers, and to specify the scheduling of those downloads. Such programs, however, require users to specifically identify which documents to be prefetched and cached or downloaded for later use, which is not always convenient.

Related to the problem of how to prioritize documents is deciding how often to validate or refresh the files (i.e., to ensure that the files are current). Generally, proxy servers are configured to perform validation either at pre-set intervals or on a demand-driven basis. Pre-set intervals may be insufficient to update the cache in a lengthy search. And, not all users will manually update the cache (by refreshing the web page).

Another important problem in information retrieval systems is how to optimize end-user (client) and network resources in network systems where various levels of caching exist. With respect to the Web, caching occurs at client browsers (in-memory caching and file-based caching), at proxy caches (e.g., ISPs, satellites, corporate firewalls, etc.), in hierarchies of proxy caches (e.g., the National Laboratory for Applied Network Research's caching network, @HOME's caching network, etc.), and in Web servers (e.g., Harvest server cache accelerator). In Intranets, caching can occur at the client computers and the network servers, which access remote databases and repositories. Most approaches to caching try to either decrease end user latency or decrease network traffic consumed in delivering the desired content. These approaches are global in nature and, as noted above, not optimal.

SUMMARY OF THE INVENTION

The invention provides an enhanced system and method of caching, which is particularly useful for caching of information on the Web, and improves performance and network traffic. Enhanced caching comes from the use of quality or value attributes, provided for example, by a recommender system or by a dynamical analysis of site accesses, which are attached to cached information.

The system and method of the invention recognizes that, everything else being equal, higher value documents are likely to be retrieved more often. Current caching algorithms do not take into account the actual perceived utility, or value, of the document contents being cached. The invention prioritizes documents in the cache according to the relative value of their content. In one embodiment, the system of the invention employs a recommender system (or collaborative filtering system) which provides a value for a document according to user recommendations. With respect to the Web, the system of the invention includes methods for determining the value for individual Web pages as well as for individual Web sites.

The system can use explicit recommendations, implicit recommendations or a combination of the two to identify the higher value documents. The system uses the measures of quality to more efficiently prioritize which documents, such as URLs, to preferentially cache. The system of the invention can be considered a "democratic caching" scheme, i.e., a caching scheme which shifts away from prior techniques which optimize network resources (which are essentially independent of the value of the document to the user) towards a new technique which optimizes resources for all users. By employing a democratic caching system, documents are cached based on their value to users and not based, for example, on the number of hits (which may occur because of the particular indexing algorithm used by the web crawler) or other essentially user-independent measures. In this manner, democratic caching enables all users of the system to benefit from caching, not just those users that consume the most resources or access a limited number of pages excessively.

Recommender systems are used in Intranet information sharing applications for organizations and Internet information sharing applications for the public. In a recommender system, the quality of the recommendation service is of primary important, and access time is equally as important. The proposed system and method of caching can also be used for managing the cache in a recommender system. Recommendations in a recommender system may be prioritized according to their value, whether explicitly or implicitly derived. Recent recommendations shared by users are cached for periods of time that increase with their value, thus improving the performance of the recommender system for its users by reducing access time to recommended items. Past recommendations will tend to disappear from the cache, although a resurgence of interest will cause the document (or URL) to persist again for some time in the cache. By coupling the caches in a document management system with a recommender system for sharing information, the invention provides improved performance for both.

For an implementation-involving accessing Web-based documents or Web pages, the system and method may be implemented with one, or a combination, of two specific methods for identifying the value of the Web pages (or URLs). The Web is the portion of the Internet that is used to store and access linked documents. A Web page is accessed by its Uniform Resource Locator (URL) address. A Web site is a generic term for various types of Web locations. In one instance, a Web site is a collection of related Web pages associated with an entity having a presence on the World Wide Web such as a company, educational institute or the like. Alternatively, a Web site can be a "portal" for providing users of the Web an entry point to the World Wide Web. A Web site may also be a repository or information source containing collections of documents that may be accessed via the Web. Generally, a Web site will have a high level URL (e.g. www. Abccompany.com), whereas the pages on the site will have lower level qualifiers (e.g. www.Abccompany.com/page1.html).

In this implementation, we distinguish between Web sites and Web pages. Although a Web site has a high level URL associated with it, for convenience we refer to Web pages and their URLs interchangeably. It should be noted that both explicit recommendations and implicit recommendation could be used in any combination or valuing Web sites and Web pages (or URLs).

The first method (a method of providing an implicit recommendation) provides a value recommendation at the Web site level (as opposed to the individual Web page or URL level) and is guaranteed to cover all the cached URLs associated with the Web sites. (Here the cache contains only Web sites listed by their URLs.) The first method statistically analyzes the number of unique visitors per Web site. Those Web sites with the highest number of unique visitors are accorded the highest value. The advantage of measuring value as a function of unique visits as opposed to total visits is that the bias created by spamming or heavy use of the Web site by only a few visitors is eliminated. Characterization of Web traffic reveals heavy-tailed distributions of the amount of traffic as a function of the number of users, with a few users accounting for the majority of the traffic (see Abdulla, G. "Analysis and Modeling of World Wide Web Traffic." Doctoral thesis, Department of Computer Science, Virginia Polytechnic Institute and State University, Blacksburg, Va. May, 1998). The proposed method is "democratic" in that it takes into account the value attribution of individual users and ensures that the benefits of caching are not limited to just heavy users.

The second method (a method of providing an explicit recommendation) couples the cache (such as a proxy cache for an organization) with a database of user ratings of the individual Web page URLs. Such a database, for example, may be provided as a component of a recommender system for Web pages, which uses filtering techniques to provide personalized recommendations to individual users. The second method provides value recommendations for individual Web pages or URLs (as opposed to Web sites), but only for a fraction of the Web page URLs in the cache. While this fraction may be small for URLs in the Web at large, it can be expected to become significant as the use of the recommender system proliferates over time. By coupling the proxy cache with a recommender system, the performance of not only the cache, but also of the recommender system is improved. By storing recent, highly rated recommendations in the proxy cache, the average download time for recommended URLs will decrease. Users will see enhanced performance causing them to rate more documents for the recommender system, improving its efficiency as well.

The two methods may be used in conjunction to evaluate the value of a Web page URL. For example, if the recommender system has provided a value for a particular URL, that value is used first. Otherwise, the value assigned to the URL is the Web site value predicted by the first method. Alternatively, a weighted combination of value from each method may be used. Another method for cache replacement includes predicted value (by any of the above methods or combinations) as well as recency and frequency of access. Since it is conceivable that at times it may be desirable to conserve network resources or minimize overall latency, it should be readily observable that the proposed democratic caching techniques can be used in tandem with the more traditional methods that optimize network bandwidth or latency. Using this scheme, the cache would switch between methods based upon the network and other system conditions, using predefined thresholds or adaptive ones.

DETAILED DESCRIPTION OF THE PREFERRED EMBODIMENT

Figure 1:
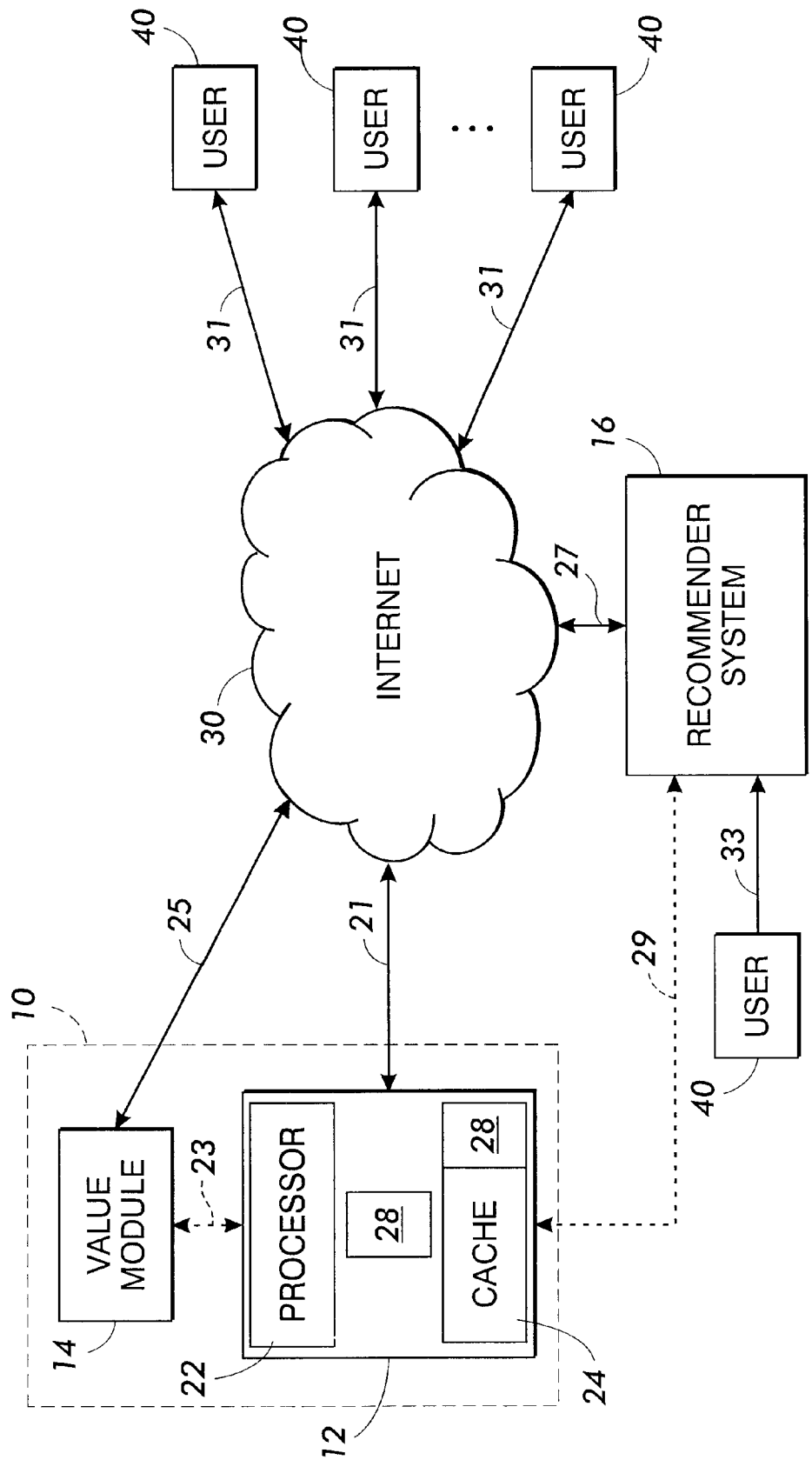
FIG. 1 is a block diagram of a system employing democratic caching according to the invention.

Referring now to the drawings, and especially to FIG. 1, a system employing democratic caching is generally shown therein and identified by reference numeral 10. System 10 includes a computer 12 having a processor 22 and cache memory 24. Also included in system 10 is value module 14, which provides a value data for each item stored in cache 24. System 10 is shown using a dotted line, since recommender system 16 may also be included in system 10. Recommender system 16 also provides value information pertaining to items to be stored in cache 24 based on user input. Computer 12 may be a client computer or a proxy server or any other computer employing a cache memory. Computer 12 may operate in any distributed network such as an intranet or the Internet (as shown in FIG. 1). Users 40 access computer 12 and recommender system 16 via the Internet 30 as indicated by solid lines 31. (Some users 40 may access computer 12 and recommender system 16 through some other form of communication as indicated by solid line 33.)

Computer 12 may communicate with value module 14 or recommender system 16 either directly (shown by doted lines 23 and 29, respectively) or indirectly through the internet 30 (shown by solid lines 21, 25 and 27). Value module 14 may provide statistical information such as the number of unique user visits to a particular web site or web page.

Recommender system 16 may provide user ratings or value in any one or more of the following: a star rating pertaining to the document's (URL's) content, an action due on the document, an expiration date of the information contained in the document, an expert opinion or rating about the document (web page or web site) or a rating from an independent organization. Recommendations usually consist of numerical ratings input manually by users, but they can also be deduced from user behavior (e.g., time spent reading a document, actions such as printing, saving or deleting a document). The premise of such systems is that a user is going to prefer an item that is similar to other items chosen by the user and by other users.

The system and method of the invention will be described in greater detail below with respect to the following preferred methods for providing value recommendations: (1) implicit site recommendations via statistical analysis of site visits; and (2) explicit URL recommendations via a recommender system. The method will also be described with regards to modifying the cache in order to take into account value recommendations and in particular, an example of a caching policy that takes into accounted the predicted value as well as recency and frequency of access is described.

IMPLICIT SITE RECOMMENDATIONS

A dynamical theory of recommendations which predicts site visits by users of the World Wide Web has recently been developed by a subset of the inventors (Huberman, B. A. and Adamic, L. A. *Novelty and Social Search in the World Wide Web*. 1998). Huberman and Adamic show that the number of users that visit given sites over periods of time, is a universal power law with an exponent related to the rate at which users discover new sites on their own. An extensive empirical study of user behavior in the Web conducted by the Huberman and Adamic confirmed this law. These results can be used directly to design effective and fair caching policies that discriminate against spamming or heavy use of a site by few individuals. Since the number of unique site visitors follows a scaling law, it suggests that caching should be performed according to this power law. Thus, the most popular sites (for a large population of users) will outrank those with the largest number of hits due to only a few users.

In the system of FIG. 1, consider the system 10 in which an implicit value module 14 works in conjunction with a proxy server 12. Module 14 analyzes the log of client (user 40) accesses to Internet 30 web sites. First, it extracts the number of unique visitors to a site by removing multiple visits by the same user. Then it associates a percentile rating with each site. For example, a site with a percentile rating of 75% has as many or more unique visitors than 75% of the sites accessed through the proxy. This percentile ranking is returned by the module 14 as a measure of the value of a site and/or any URL associated with the site. (Proxy server 12 stores URL addresses in cache 24 according to this percentile ranking.)

Module 14 for calculating implicit site recommendations may reside separately as shown in FIG. 1, or it may reside within the proxy server 12 (or cache 24) and is shown as module 28 in FIG. 1. Module 14 or 28 provides an application program interface (API) which allows the processor 22 to query the cache 24 for the predicted value of any URL, a list of URLs, any site or a list of sites. In addition, the API allows the processor 22 to query the module 14 or 28 for the range of possible values returned by the module.

EXPLICIT URL RECOMMENDATIONS

Figure 4:
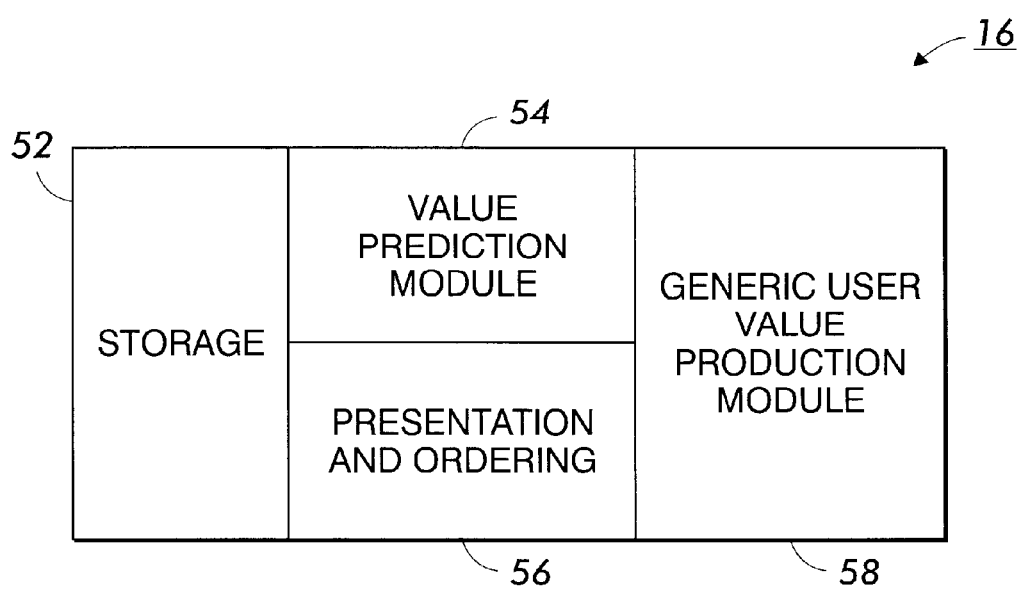
FIG. 4 is a block diagram of a recommender system used in the system of FIG. 1.

A generic recommender system typically includes three modules: data storage, value prediction and ordering. Referring to FIG. 4, a recommender system 16 for Web URLs data storage 52, value prediction module 54 and presentation and ordering module 56. For URLs, the data storage module 52 includes, at minimum, date of entry, user IDs and user ratings (or preference rankings) of the URLs. The value prediction module 54 includes an algorithm for predicting the value, or relative rank, of the URL for a user. The presentation and ordering module 56 orders the presentation of the recommended URLs in accordance with their predicted values, or predicted relative ranks.

Recommender system 50 also includes value prediction 58, which predicts the value of the URL for a generic user. Generally, module 58 makes this prediction on a weighted sum of users' ratings for a URL. In the simplest case, this prediction will simply be the average of all the ratings received for a URL. Alternatively, the weights could be biased towards ratings from users whose opinion is objectively valued higher by other users. Such an objective function for taking into account the value of a user's opinion could be a function of the sum of that user's correlation with all other users; alternatively (or in addition), it could take into account the number of hits a user's recommendations receive.

The module 58 provides an API which permits the cache 24 to query for the predicted value of one or a list of URLs provided as parameters, permits the cache 24 to query for a list of URLs and predicted values, passing as an optional parameter a date value. In the latter case, if a date value is provided, the module 58 returns only URLs whose date of entry into the recommender system data space is greater than the date specified by the cache. Finally, the API allows the cache 24 to query the module 58 for the range of possible values returned by the module.

The <URL, value> pairs returned by the module 58 can be extended to include additional information about the URLs stored in the data space. One example of information of potential use to the cache is user-input expiry dates or modification periodicity. The cache 24 can then use these values to more efficiently flush URLs and perform validation.

DEMOCRATIC CACHING POLICY

Assume that the proxy server 12 re-assigns a caching priority to each URL stored in cache 24 periodically. When the cache 24 is full, it then releases the lowest priority items until there is enough memory to store the new item in the cache. Proxy server 12 may also operate cache 24 in conjunction with the two modules (value module 14 and recommender system 16) providing implicit and explicit recommendations. Given the flexibility of the APIs for the two modules, numerous variations are possible.

Figure 2:
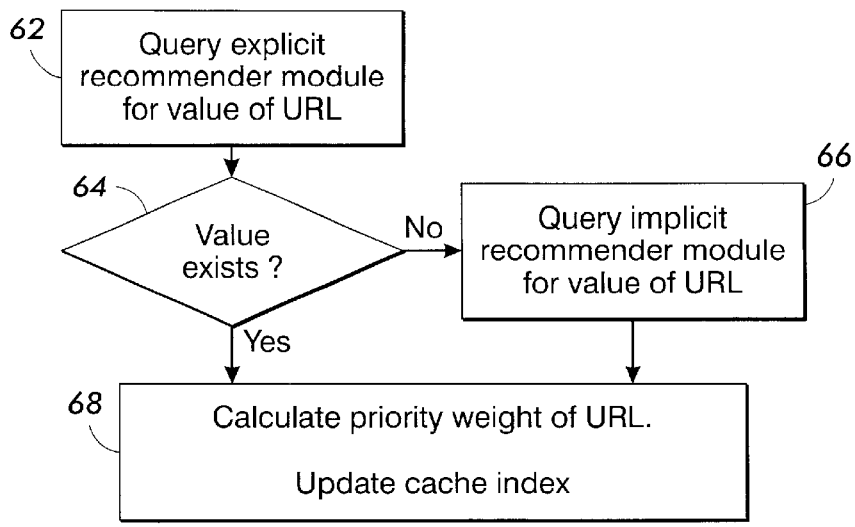
FIG. 2 is a flow chart describing a method for assigning a priority weight to a URL.

A flow chart showing a method of assigning a priority weight to a URL is shown in FIG. 2. When the processor 22 re-evaluates the priority of a URL, it first queries the explicit recommendation module 16 for its predicted value of the URL (step 62). If the explicit recommendation module is able to make a recommendation (step 64), then the processor proceeds to calculate the priority using this value (step 68), as described below with reference to FIG. 3. Otherwise, it then queries the implicit recommendation module 14 for its predicted value of the URL (step 66) and then uses this value to calculate the priority of the URL. The reason for preferring the value predicted by explicit recommendation over implicit recommendation is that the former is specific to the URL, while the latter generalizes over the entire site. Note, however, that even in the case of implicit recommendation, the caching priority calculation will be URL-specific as it also takes into account the recency and frequency of access for the particular URL.

Reddy, M. and G. P. Fletcher. "An Adaptive Mechanism for Web Browser Cache Management." *IEEE Computing* January/February 1998, describes a caching priority algorithm that takes into account overall frequency of use, as well as recency, irrespective of file size. In module 54/58 of recommender system 16, we modify the Reddy and Fletcher algorithm to take into account the retrieved value of the URL. Reddy and Fletcher estimate the mean time to the next request (MTNR) for a URL by applying exponential smoothing techniques to records of previous requests, as well as the current transaction: $MTNR_i = \alpha t_i + (1-\alpha)MTNR_{i-1}$, where $t_i$ is the time since the last reference, $MTNR_{i-1}$ is the previous value, and $\alpha$ is the exponential damping coefficient (they give operational values between 0.1 and 0.3). The weighting metric for determining the priority of a document in the cache is the likely frequency of document requests, which is inversely proportional to $$MTNR: w(t_i) = \frac{1}{mtnr_i}.$$

High values of $\alpha$ emphasize recency of document requests ($\alpha=1$ reduces to prioritizing URLs by last date of access), while low values of $\alpha$ emphasize past values of recency far more than current ones.

In the democratic cache, we could adopt such a weighting criteria, but modified by the URL's estimated value in order to bias the cache towards documents of high value. For example, we could make the damping coefficient, $\alpha$, dependent on the value:

$$\alpha' = \frac{\alpha}{f(v_i)}.$$

Here, $v_i$ is the value of document i as provided by the recommender system, and $f(v_i)$ is a monotonically increasing function of the utility. In this way, highly valued documents are cached for relatively longer periods of time than lower valued documents, frequency and recency being otherwise the same. However, it will still happen that a lower value document with more frequent and recent access will move higher in priority than a higher valued document with less frequent and less recent access. It is very important that the cache display this behavior. Imagine, for example, that priority was simply a function of perceived value: over time, the cache would become filled with the most highly valued documents, independent of whether or not they were still being accessed.

These three equations now together allow the processor 22 to determine the priority of a URL in a way that takes into account not only the recency and frequency of access, but also the estimated value of the URL. However, a URL often points to a page that entails the downloading of additional URL at the same site (e.g., URLs with frames and/or GIF images). If the estimated value was provided by the implicit recommendation module, then we are done, because this module will provide the same recommendation value for all URLs from the same site and it will be possible to calculate the priorities of each of the entailed URLs separately. It is possible the URL may even entail URLs at external sites. To cover this case the method described above may be broadened to cover URLs with implicit site-based recommendations as well.

However, if the estimated value comes from the explicit recommendation module, the situation becomes more complex. While the explicit recommendation exists for the parent URL, it almost certainly does not exist for the entailed URLs, which may also be cached. Thus, each such URL must be parsed in order to extract the entailed URLs. All the entailed URLs then inherit the predicted value returned by the explicit recommendation for the parent URL. This value is then used in the priority calculations for the entailed URLs. If the entailed URL has previously been assigned a priority weight within the same priority reevaluation period (because, for example, the same URL is entailed by more than one parent URL), then it retains the maximum of the previous assignment and the current one. This process is described with the flowchart of FIG. 3.

Figure 3:
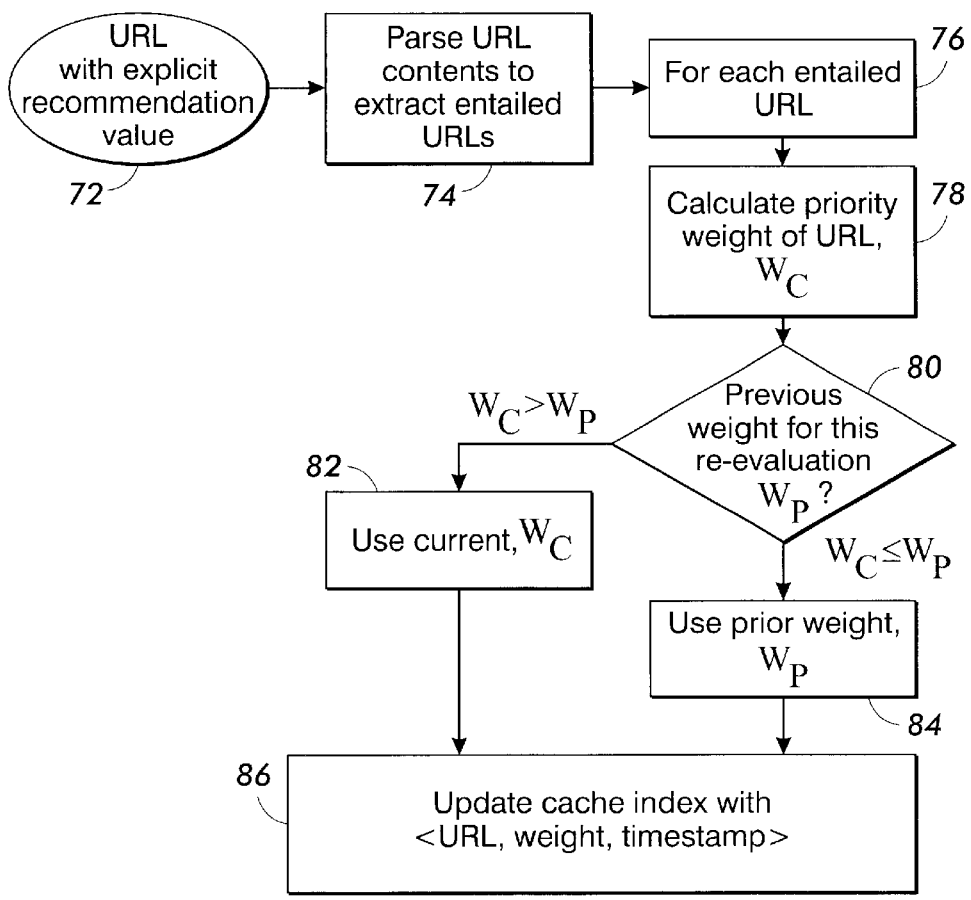
FIG. 3 is a flow chart describing a method for assigning caching priority weights to entailed URLs.

Referring to FIG. 3, in step 72, the URL with the explicit recommendation value is provided. In step 74, the URL contents are parsed to extract the entailed URLs. In step 76, for each URL, the priority weight $W_c$ of the entailed URL is calculated in step 78. If a the previous weight $W_p$ for this reevaluation period exists in step 80, check if it is larger (step 84) or smaller (step 82). Update the cache index with the cache index in cache 24 with the URL, weight, time stamp.

In practice, the behavior of the democratic cache will be tightly linked with the recommender system. Recent recommendations will be cached, thus improving the performance of the recommender system for its users by reducing their access time to recommended items. Past recommendations will tend to disappear from the cache, although a resurgence of interest will cause the URL to persist again for some time in the cache.

Furthermore, the recommender system may provide the democratic cache with additional information, such as the expiry date of the URL and/or re-fetch rate (also potentially available as meta-data within the HTML). For URLs declared of short-term interest in the recommender system (re-fetch rate=0), the cache can then delete the URL after the expiry date, for example. On the other hand, for URLs with non-zeros re-fetch rates (daily, weekly, etc.), the cache can perform pre-fetching of the URL at fixed intervals for URLs currently in the cache. The pre-fetching can be performed during low-load periods.

It will be appreciated that the present invention may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for determining which items to store in a cache, comprising:
    obtaining user-dependent value data for each item to be stored in the cache, wherein user-dependent value data comprises a measure of the relative quality or value attributes of the item to a particular user;
    associating the value data with the item;
    prioritizing the items to be stored in the cache in accordance with the relative value of each item, wherein relative value is based upon the number of unique users providing user-dependent value data for each item; and
    storing those items having the highest value in the cache.

2. The method of claim 1, wherein the value data comprises recommendation data from a recommender system which provides a value for an item according to user recommendations.

3. The method of claim 2, wherein recommendation data is a function of the quality and the quantity of recommendations from users of the item.

4. The method of claim 1, wherein the items comprise web sites and wherein the value data comprises the number of unique users visiting the web site.

5. The method of claim 1 wherein the value data further includes recency and frequency of web site access data.

6. The method of claim 1 further comprising, for each item stored in the cache, validating the item's value data and reprioritizing the items stored based on the validated value data.

7. The method of claim 1, further comprising:
    obtaining recency and frequency of use data for each item; and
    prioritizing the items to be stored in the cache in accordance with the relative value of each item and each item's recency and frequency of use.

8. The method of claim 1, wherein the prioritizing step comprises evaluating w(ti), the weighting metric, $$w(t_i) = \frac{1}{MTNR_i},$$

where $MTNR_i = \alpha' t_i + (1 - \alpha')MTNR_{i-1}$ and $\alpha' = \frac{\alpha}{f(v_i)}$, $MTNR_i$ is the mean time to the next request for item i, $t_i$ is the time since the last reference, $MTNR_{i-1}$ is the previous value, $\alpha'$ is the exponential damping coefficient, $v_i$ is the value or utility of item i as provided by a recommender system, and $f(v_i)$ is a monotonically to increasing function of the value; and
    storing those items having the greatest weight in the cache.

9. A system for caching items on a distributed network, comprising:
    a computer for storing and for retrieving items from the network, wherein the computer includes a processor and a cache for storing items retrieved from the network, wherein the processor, responsive to a request for a particular item, determines if the item is stored in the cache and if not, retrieves the item from the network; and
    a value module for providing user-dependent value data for items retrieved from the network, wherein user-dependent value data comprises a measure of the relative quality or value attributes of the item to a particular user;
    wherein the processor, for each retrieved item, responsive to the retrieved item's value data, prioritizes the retrieved item and any items stored in the cache in accordance with the relative value data of each item, wherein relative value is based upon the number of unique users providing user-dependent value data for each item; and stores those items having the highest value data in the cache.

10. The system of claim 9, wherein the value module further comprises a recommender system for providing a value data for an item according to user recommendations.

11. The system of claim 10, wherein the recommender system provides recommendation data as a function of the quality and the quantity of recommendations from users of the item.

12. The system of claim 9, wherein the processor, for each item stored in the cache, validates the item's value data and reprioritizes the items stored based on the validated value data.

13. The system of claim 9, wherein the processor further obtains recency of use data for each item; and priorities the items to be stored in the cache in accordance with the relative value of each item and each item's recency of use data.

14. The system of claim 9, wherein the processor priorities the items in accordance with an evaluation of w(ti), the weighting metric:

$$w(t_i) = \frac{1}{MTNR_i},$$

where $MTNR_i = \alpha' t_i + (1 - \alpha')MTNR_{i-1}$ and $\alpha' = \frac{\alpha}{f(v_i)}$, $MTNR_i$ is the mean time to the next request for item i, $t_i$ is the time since the last reference, $MTNR_{i-1}$ is the previous value, $\alpha'$ is the exponential damping coefficient, $v_i$ is the value or utility of item i as provided by a recommender system, and $f(v_i)$ is a monotonically increasing function of the value; and stores those items having the greatest weight in the cache.

15. The system of claim 9, wherein the value data comprises positive, negative and zero values and wherein an item receives a value data of zero if no value data is available for it.

16. The system of claim 9, wherein the computer comprises a network proxy server.

* * * * *